United States Patent [19]

Fratty

[11] Patent Number: 4,654,759

[45] Date of Patent: Mar. 31, 1987

[54] TWO-HEADLAMP MAIN BEAM UNITS FOR MOTOR VEHICLES

[75] Inventor: Hector Fratty, Boulogne, France

[73] Assignee: Cibie Projecteurs, Bobigny, France

[21] Appl. No.: 842,621

[22] Filed: Mar. 21, 1986

[30] Foreign Application Priority Data

Mar. 26, 1985 [FR] France ............................... 85 04470

[51] Int. Cl.⁴ .......................... B60Q 1/12; B60Q 1/00; F21V 7/00

[52] U.S. Cl. ........................................ 362/61; 362/83; 362/305

[58] Field of Search ..................... 362/61, 80, 83, 227, 362/248, 241, 240

[56] References Cited

U.S. PATENT DOCUMENTS

| | | | |
|---|---|---|---|
| 1,448,434 | 3/1923 | Culver | 362/305 |
| 1,462,946 | 7/1923 | Stephens | 362/304 |
| 3,710,097 | 1/1973 | Bright et al. | 362/80 |
| 4,225,904 | 9/1980 | Linder | 362/61 |
| 4,503,488 | 3/1985 | Soules et al. | 362/83 |
| 4,513,357 | 4/1985 | Hieda et al. | 362/83 |
| 4,545,001 | 10/1985 | English et al. | 362/61 |
| 4,575,787 | 3/1986 | Birt | 362/61 |

FOREIGN PATENT DOCUMENTS

| | | |
|---|---|---|
| 557511 | 8/1923 | France . |
| 654047 | 3/1929 | France . |
| 1319105 | 1/1963 | France . |
| 1494309 | 8/1967 | France . |
| 1598459 | 8/1970 | France . |
| 2048179 | 3/1971 | France . |

*Primary Examiner*—Raymond A. Nelli

[57] ABSTRACT

The invention relates to a main beam unit for a motor vehicle, said unit comprising first and second juxtaposed parabolic main beam headlamps (10, 20). In accordance with the invention, these headlamps are of different aperture diameters and of different focal lengths, with the aperture diameter $d_1$ of the first headlamp being greater than the aperture diameter $d_2$ of the second headlamp, and with the focal length $f_1$ of the first headlamp being greater than the focal length $f_2$ of the second headlamp.

8 Claims, 7 Drawing Figures

TWO-HEADLAMP MAIN BEAM UNITS FOR MOTOR VEHICLES

The present invention relates to road lighting sets for motor vehicles.

BACKGROUND OF THE INVENTION

Proposals have already been made to replace the single main beam headlamp which is generally used on each side of a vehicle by a set of two identical juxtaposed headlamps, thereby providing greater illumination at long distances by increasing the amount of light flux emitted.

This also gives rise to an increase in illumination at short distances (in particular at distances of less than 30 meters), and this is undesirable for obtaining good visibility at a distance since the brightly illuminated nearby regions make it difficult to see more distant regions even if they are more brightly illuminated than usual. In other words, increasing the total emitted light flux by using a pair of identical headlamps to replace a single headlamp merely serves to accentuate the illumination gradient around the area which can be seen properly.

Preferred implementations of the present invention seek to mitigate this difficulty by means of a two-headlamp main beam unit which provides a better distribution of illumination as a function of distance, and thereby increases long distance illumination relative to conventional solutions.

SUMMARY OF THE INVENTION

The present invention provides a main beam unit for a motor vehicle, said unit comprising first and second juxtaposed parabolic main beam headlamps, wherein said headlamps are of different aperture diameters and of different focal lengths, the aperture diameter $d_2$ said first headlamp being greater than the aperture diameter $d_2$ of said second headlamp, and the focal length of said first headlamp $f_1$ being greater than the focal length $f_2$ of said second headlamp.

Advantageously, the ratio $(f_1-f_2)/(f_1+f_2)$ lies in the range 0.05 to 0.25, and lies preferably in the range 0.10 to 0.15.

The focal lengths are preferably chosen to have values such that $f_1>20$ mm, $f_2<20$ mm, and $f_1-f_2\geqq 5$ mm.

BRIEF DESCRIPTION OF THE DRAWINGS

An embodiment of the invention is described by way of example with reference to the accompanying drawings, in which.

MORE DETAILED DESCRIPTION

Figure 1:
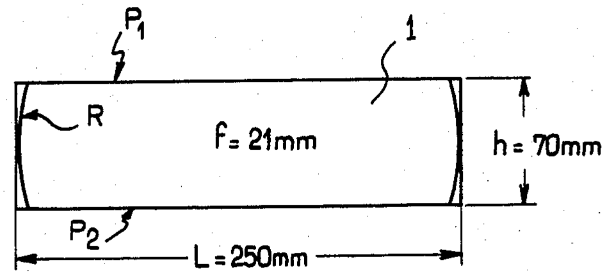
FIG. 1 is a front view of a single main beam headlamp, having a reflector in the form of a truncated paraboloid.

In the following description, the main beam units considered are all constituted by conventional parabolic type headlamps comprising:

a reflector in the form of a paraboloid of revolution, which reflector may be truncated by two parallel planes Pl and P2 (as shown in FIG. 1) so as to have a substantially rectangular aperture in the front face of the vehicle;

an axial filament extending rearwardly from the focus towards the reflector, thereby enabling a brightly illuminated, narrow, central zone to be obtained using light rays coming from the focus, which central zone is surrounded by a broad and moderately illuminated zone using light rays coming from the rear portion of the filament; and a closure glass provided with stripes or prisms for optimizing the angular distribution of the light beam.

Figure 4:
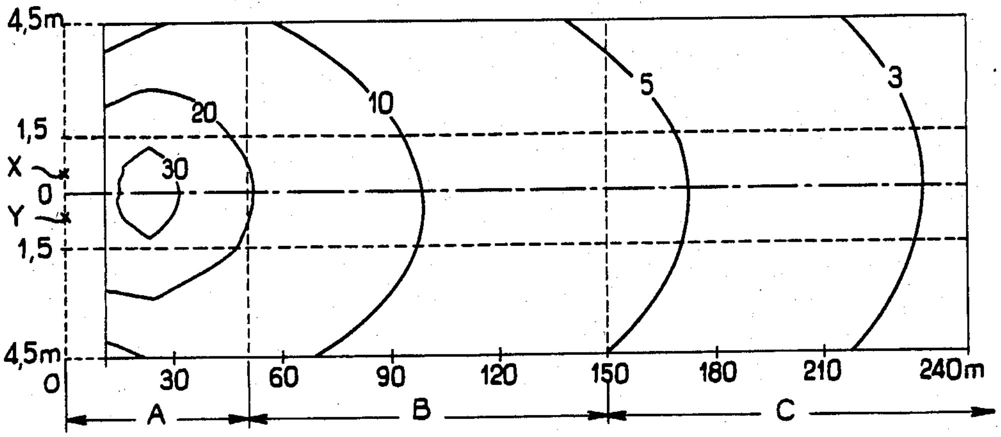
FIGS. 4 to 6 are isolux curves of ground illumination obtained using the main beam units of FIGS. 1, 2, and 3, respectively.

The headlamps shown in FIG. 1 has a 70 mm×250 mm aperture, a focal length of 21 mm, and a light source constituted by an Hl standard type bulb, and this headlamp provides isolux curves of ground illumination as shown in FIG. 4 (which curves were plotted under standardized measuring conditions using two headlamps disposed at points X and Y which are 1 meter apart).

Three regions can be distinguished from this plot: a region A (from 0 to 50 meters) which is close to the vehicle, a region B (from 50 to 150 meters) where good illumination is essential for comfortable vision, and a distant zone C (beyond 150 meters) where good illumination determines the maximum range of road illumination.

Figure 2:
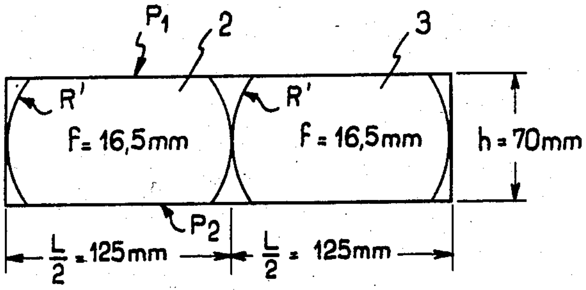
FIG. 2 is a front view of a main beam unit having the same aperture size and comprising two identical headlamps placed side-by-side instead of a single headlamp.

One solution for increasing the efficiency with which the road is illuminated consists in replacing the single headlamp 1 by two identical juxtaposed headlamps 2 and 3. This is shown in FIG. 2.

Figure 5:
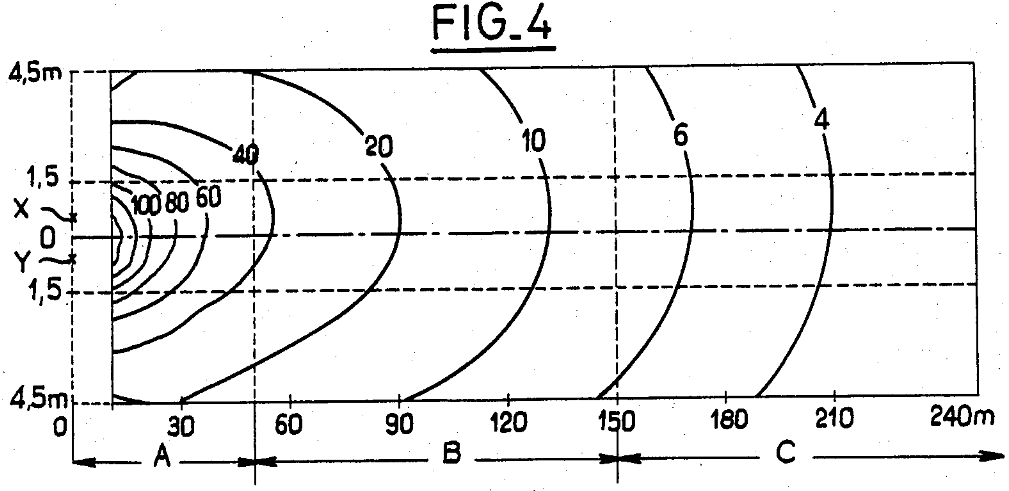

For the same aperture size of 70 mm×250 mm, and using two headlamps having a focal length of 16.5 mm and each having an Hl type bulb, isolux curves of the kind shown in FIG. 5 are obtained (under identical measuring conditions to those used for obtaining the FIG. 4 curves).

As can be seen, there is an improvement both in the maximum range of road illumination (greater illumination in zone C) and in comfortable vision (greater illumination in zone B). Unfortunately, the illumination in zone A and particularly at ranges of less than 30 meters, becomes extremely intense so that the zones closest to the driver are very brilliantly illuminated thereby creating a "black hole" effect for the zones situated at more than 50 meters, and although the absolute value of the illumination in the more distant zones is greater than in the preceding case, they cannot be seen any more clearly by the driver.

Figure 3:
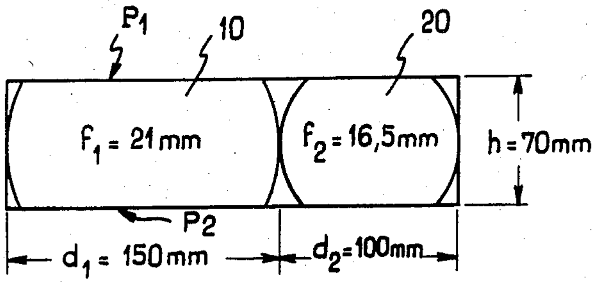
FIG. 3 is a front view of a main beam unit in accordance with the invention having two juxtaposed headlamps of different aperture diameters and different focal lengths.

FIG. 3 shows the solution in accordance with the present invention, in which the headlamps are no longer identical, and in which the two headlamps 10 and 20 have different aperture diameters $d_1$ and $d_2$ and different focal lengths $f_1$ and $f_2$ (with the headlamp having the greater aperture having the greater focal length).

For a main beam unit intended to fit a rectangular aperture of 70 mm×250 mm, a first headlamp may be chosen to have an aperture diameter of 150 mm and a focal length of 21 mm while a second headlamp may be chosen to have an aperture diameter of 100 mm and a focal length of 16.5 mm. Both headlamps have identical HI type bulbs and a conventional striped closure glass is provided.

Figure 6:
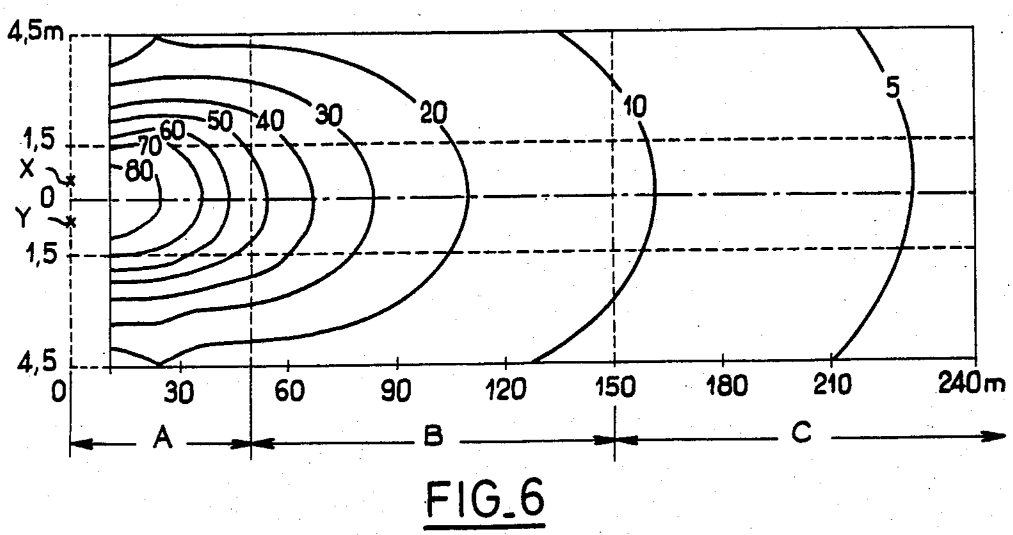

The corresponding isolux ground illumination curves are shown in FIG. 6. As can be observed from FIG. 6, the above headlamp disposition provides three advantages:

the maximum range is increased (zone C): for example a value of about 10 lux may be obtained on axis at a range of about 160 meters instead of at about 130 meters as is the case when using two identical headlamps;

visual comfort is improved (illumination in zone B): on axis illumination varies over the range 12 to 55 lux instead of over the range 8 to 45 lux as is the case when using two identical headlamps; and a reduction in the "black hole" effect by virtue of the light flux being spread better as a function of distance (zone A): in particular for distances of less than 25 meters, illumination is less than when using two identical headlamps, thereby reducing the extent to which a driver is dazzled.

Figure 7:
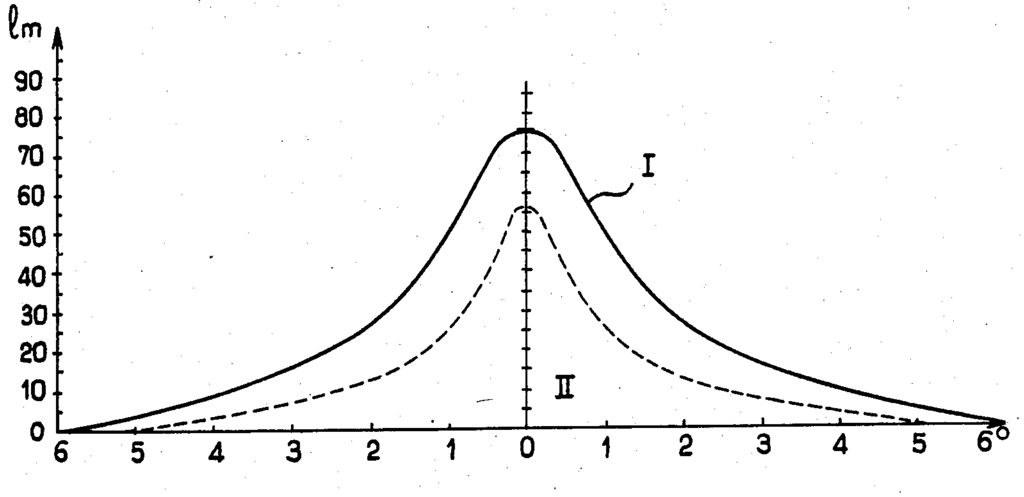
FIG. 7 is a graph showing the light flux distribution about a central axis for the FIG. 3 main beam unit.

Finally, FIG. 7 shows the angular distribution of light flux for a main beam unit in accordance with the invention.

Points on curve I correspond to light flux values taken over narrow vertical strips having apertures of 0.25°, and for a range of angles relative to the axis varying from −6°, to +6°.

By way of comparison, curve II relates to the single headlamp of FIG. 1, which flux measurements being made in the same way as for curve I.

I claim:

1. A main beam unit for a motor vehicle, comprising first and second juxtaposed parabolic main beam headlamps wherein said headlamps are of different aperture diameters and of different focal lengths, the aperture diameter $d_1$ of said first headlamp being greater than the aperture diameter $d_2$ of said second headlamp, and the focal length of said first headlamp $f_1$ being greater than the focal length $f_2$ of said second headlamp.

2. A unit according to claim 1, wherein the ratio $(f_1-f_2)/(f_1+f_2)$ lies in the range 0.05 to 0.25.

3. A unit according to claim 2, wherein the ratio $(f_1-f_2)/(f_1+f_2)$ lies in the range 0.10 to 0.15.

4. A unit according to claim 1, where $f_1>20$ mm, $f_2<20$ mm, and $f_1-f_2\geqq 5$ mm.

5. A unit according to any preceding claim 1 wherein said headlamps are both truncated between two horizontal parallel planes.

6. A unit according to claim 2 wherein said headlamps are both truncated between two horizontal parallel planes.

7. A unit according to claim 3 wherein said headlamps are both truncated between two horizontal parallel planes.

8. A unit according to claim 4 wherein said headlamps are both truncated between two horizontal parallel planes.

* * * * *